US008605721B1

(12) United States Patent
Chan et al.

(10) Patent No.: US 8,605,721 B1
(45) Date of Patent: Dec. 10, 2013

(54) SCALABLE ISLAND MULTICAST FOR PEER-TO-PEER MEDIA DELIVERY

(75) Inventors: Shueng Han Gary Chan, Hong Kong (CN); Xing Jin, Hong Kong (CN); Kan Leung Cheng, Hong Kong (CN); Ho Shing Tang, Hong Kong (CN)

(73) Assignee: The Hong Kong University of Science and Technology, Kowloon (HK)

( * ) Notice: Subject to any disclaimer, the term of this patent is extended or adjusted under 35 U.S.C. 154(b) by 1582 days.

(21) Appl. No.: 11/753,965

(22) Filed: May 25, 2007

Related U.S. Application Data

(60) Provisional application No. 60/808,199, filed on May 25, 2006.

(51) Int. Cl.
*H04L 12/28* (2006.01)
(52) U.S. Cl.
USPC .......................................... 370/390; 709/238
(58) Field of Classification Search
None
See application file for complete search history.

(56) References Cited

U.S. PATENT DOCUMENTS

| | | | |
|---|---|---|---|
| 6,167,432 A | 12/2000 | Jiang | |
| 6,353,596 B1* | 3/2002 | Grossglauser et al. | 370/256 |
| 6,611,872 B1* | 8/2003 | McCanne | 709/238 |
| 6,965,593 B2 | 11/2005 | Donahue et al. | |
| 7,080,157 B2 | 7/2006 | McCanne | |
| 7,171,491 B1* | 1/2007 | O'Toole et al. | 709/244 |
| 7,185,077 B1* | 2/2007 | O'Toole et al. | 709/223 |
| 7,457,257 B2* | 11/2008 | Tang et al. | 370/256 |
| 7,457,288 B2* | 11/2008 | Park et al. | 370/390 |
| 7,580,368 B2* | 8/2009 | Yoneda et al. | 370/254 |
| 7,593,333 B2* | 9/2009 | Li et al. | 370/232 |
| 7,593,353 B2* | 9/2009 | Liu et al. | 370/256 |
| 7,613,796 B2* | 11/2009 | Harvey et al. | 709/220 |
| 7,620,847 B1* | 11/2009 | Maxemchuk et al. | 714/18 |
| 7,760,659 B2* | 7/2010 | Luo et al. | 370/252 |
| 7,818,402 B1* | 10/2010 | Zhang | 709/219 |
| 2003/0023898 A1* | 1/2003 | Jacobs et al. | 714/15 |

OTHER PUBLICATIONS

X. Zhang, et al., "CoolStreaming/DONet: A data-driven overlay network for efficient live media streaming", in Proc. IEEE Infocom '05, Mar. 2005.
Y. hua Chu, et al., "A case for end system multicast", ACM SIGMETRICS'00, pp. 1-12, Jun. 2000.
S. Banerjee et al., "Scalable application layer multicast", in. Proc. ACM SIGCOMM'02, p. 205-220, Aug. 2002.
Y. Guo, et al., "P2Cast: Peer-o-peer patching scheme for VoD service", in Proc. Www'03, May 2003.
K.-L. Cheng, et al., "Implementation and performance measurement of an island multicast protocol", in Proc. IEEE ICC'05, May 2005.
Y. Chawathe, "Scattercast: An architecture for Internet broadcast distribution as an infrastructure service", PhD thesis, University of California, Berkeley, Dec. 2000.

(Continued)

*Primary Examiner* — Michael J Moore, Jr.
(74) *Attorney, Agent, or Firm* — Turocy & Watson, LLP

(57) ABSTRACT

A system and method of integrating IP multicasting with application layer multicasting for media streaming. The proposed approach teaches forming an overlay P2P tree using a scalable protocol. New node either detects an existing IP multicasting island to join or forms a new one. Ingress node of each island is adaptively elected and streams media to nodes in its island via IP multicasting, while getting the media from its parent node via traditional unicast to achieve much lower end-to-end delay and link stress.

37 Claims, 13 Drawing Sheets

(56) References Cited

OTHER PUBLICATIONS

P. Francis et al., "Your Own Internet Distribution YOID", http://www.isi.edu/div7/yoid/, 2002.

K.-W. Cheuk et al., "Island multicast: The combination of IP multicast with application-level multicast", in Proc. IEEE ICC'04, Jun. 2004.

J. Jannotti, et al., "Overcast: Reliable multicasting with an overlay network", in Proc. OSDI'00, pp. 197-212, Oct. 2000.

E. Zegura, et al., "How to model an internetwork", in Proc. IEEE INFOCOM'96, vol. 2, pp. 594-602, Mar. 1996.

M. Castro, et al., "SplitStream: High-bandwidth multicast in a cooperative environment", in Proc. ACM SOSP'03, Oct. 2003.

K.-F. Wong, et al., "Lateral error recovery for application-level multicast", in Proc. IEEE INFOCOM'04, Mar. 2004.

J. Liebeherr, et al., "Application-layer multicasting with Delaunay triangulation overlays", IEEE JSAC, vol. 20, pp. 1472-1488, Oct. 2002.

T. Do, et al., "P2VoD: Providing fault tolerant video-on-demand streaming in peer-to-peer environment", in Proc. IEEE ICC'04, pp. 1467-1472, Jun. 2004.

D. Kostic, et al., "Bullet: high bandwidth data dissemination using an overlay mesh", in Proc. of ACM SOSP'03, pp. 282-297, Oct. 2003.

X. Zhang, et al., "CoolStreaming/DONet: A data-driven overlay network for peer-to-peer live media streaming", in Proc. IEEE INFOCOM'05, pp. 2102-2111, Mar. 2005.

M. Zhou et al., "A hybrid overlay network for video-on-demand", in Proc. IEEE ICC'05, pp. 1309-1313, May 2005.

Y. H. Chu et al., "A case for end system multicast", IEEE JSAC, vol. 20, pp. 1456-1471, Oct. 2002.

D. Pendarakis et al., "ALMI: an application level multicast infrastructure", in Proc. USITS'01, pp. 49-60, Mar. 2001.

M. Kwon et al., "Topology-aware overlay networks for group communication", in Proc. ACM NOSSDAV'02, pp. 127-136, May 2002.

X. Jin, et al., "Fast overlay tree based on efficient end-to-end measurements", in Proc. IEEE ICC'05, pp. 1319-1323, May 2005.

J. Rosenberg et al., "STUN—simple traversal of user datagram protocol (UDP) through network address translators (NATs)". RFC 3489, Mar. 2003.

A. Ganjam et al., "Connectivity restrictions in overlay multicast", in Proc. ACM NOSSDAV'04, 2004.

W.-P. Yiu et al., "Lateral error recovery for media streaming in application-level multicast", IEEE TMM, vol. 8, pp. 219-232, Apr. 2006.

X. Jin, et al., "SIM: Scalable island multicast for peer-to-peer media streaming", in Proc. IEEE ICME'06, pp. 913-916, Jul. 2006.

W.-C. W. Wong et al., "Improving Delaunay triangulation for application-level multicast", in Proc. IEEE GLOBECOM'03, pp. 2835-2839.

P. Parnes, et al., "Lightweight application level multicast tunneling using mTunnel", Computer Communication, pp. 1295-1301, 1998.

R. Finlayson, "The UDP multicast tunneling protocol", draft-finlayson-umtp-09.txt, Nov. 2003.

J. Park, et al., "Multicast delivery based on unicast and subnet multicast", IEEE Communications Letters, vol. 5, pp. 1489-1499, Apr. 2001.

B. Zhang, et al., "Host multicast: A framework for delivering multicast to end users", in Proc. IEEE INFOCOM'02, pp. 1366-1375, Jun. 2002.

V. Goyal, "Multiple description coding: compression meets the network", IEEE Signal Processing Magazine, vol. 18, pp. 74-93, Sep. 2001.

\* cited by examiner

| Type | Condition | Recovery Latency | Requirements |
|---|---|---|---|
| I | $t_j \geq t_i + d_{ij}$ | $t_j + d_{ji} - t_i$ | $t_j + d_{ji} - t_i \leq \delta_j$ |
| II | $t_j < t_i + d_{ij}$ | $d_{ij} + d_{ji}$ | $d_{ij} + d_{ji} \leq \delta_j$, $t_i + d_{ij} \leq t_j + B_j$ |

Fig. 5

SCALABLE ISLAND MULTICAST FOR PEER-TO-PEER MEDIA DELIVERY

CROSS-REFERENCE TO OTHER APPLICATION

This application claims priority from U.S. provisional patent application 60/808,199 filed May 25, 2006, which is hereby incorporated by reference.

BACKGROUND AND SUMMARY OF THE INVENTIONS

The present application relates to media delivery, and more particularly to media multicasting by integrating scalable overlay peer-to-peer tree networks with IP multicasting.

Background: Media Streaming

With the development of general broadband network access, there has been increasing interest in media streaming systems, methods, devices and protocols. Peer-to-peer ("P2P") media streaming systems have been developed to overcome limitations in traditional server-based streaming. In a P2P media distribution system, cooperative peers may self-organize themselves into an overlay network via unicast tunnels. The peers cache and relay data for receipt by other peers, eliminating the need for powerful centralized servers to provide data to each and every client.

Some typical overlays used in P2P media streaming are tree structure overlays and a gossip mesh. The tree structure builds one or more overlay trees to distribute data among nodes. Examples include application-layer multicast ("ALM") schemes (e.g., Narada and NICE) and some P2P video-on-demand systems (e.g., P2Cast and P2VoD).

A gossip mesh is built among nodes using gossip algorithms, with nodes exchanging data with their neighbors in the mesh. While a gossip mesh typically enjoys better resilience regarding network and group dynamics, gossip-based approaches typically suffer from a higher control overhead due to data scheduling and mesh maintenance. A gossip mesh may have poor playback delay as the data clips are transmitted over multiple paths to a node and the length of the paths create video delay.

Trees introduce lower end-to-end delay and are typically easier to maintain. Some previously proposed tree-based ALM protocols such as Narada, NICE, DT, Scribe, ALMI, etc.) assume that none of the routers are multicast-capable and hence have not considered the use of the underlying multicast capability.

Although global IP multicast is not available today, many local networks in today's Internet include multicasting. These local multicast-capable domains, or so-called "islands," are often interconnected by multicast-incapable or multicast-disabled routers.

What is needed, therefore, is an ALM system that makes use of the local multicast capabilities in building trees.

Most ALM protocols only make use of unicast transmission. They move the multicast-related functionalities from routers to nodes and achieve multicast via piece-wise unicast connections. ALM works without the need of multicast routers. However, it is not as efficient as IP multicast. More packets have to be transmitted in the network and users have to suffer larger delay before the packets are received.

Though protocols such as Scattercast, YOID, UMTP, mTunnel, AMT, UniversalMulticast (UM) and Subset Multicast (SM) have been proposed to combine IP multicast with ALM, many of them require special nodes, such as proxies or routers.

Others require manual configuration for inter-node connections. Some have proposed a distributed approach to integrate IP multicast and ALM where each island has a designated leader. The leader identifies some ingress and egress nodes in its island for data delivery. This approach puts heavy control loads on leaders and has complex mechanism for the in of leaders, ingress nodes, and egress nodes.

Scalable Island Multicast for Peer-to-Peer Media Delivery

SIM has integrated IP multicast with ALM to achieve higher transmission efficiency. This integration is especially important for streaming applications. Define link stress as the number of copies of a packet transmitted over a certain physical link. We have done simulations to evaluate some representative ALM protocols. In a group of 1024 hosts, protocols such as Narada, GNP-based DT, TAG, Overcast achieve average link stresses of 2.9, 2.69, 2.61 and 2.02, respectively. The maximum link stresses achieved by these protocols are 40, 24, 28 and 14, respectively. Considering that a single stream usually requires several hundred Kbps transmission rate, the current Internet often cannot provide enough bandwidth for the streaming. On the other hand, as IP multicast always keeps the stresses of all the delivery links being 1, it significantly improves the delivery efficiency and reduces the bandwidth consumption. Therefore. SIM is more applicable for streaming applications than pure ALM protocols.

The advantages of the proposed approach are highlighted as follows:

A fully distributed scheme that combines IP multicast with ALM for media streaming. No central control or management is needed. The system is hence scalable to a large number of users.

Fully autonomous. A host can automatically detect multicast island to join. It does not require any special nodes (such as special routers or proxies) and does not need any manual configuration.

Low control overhead. Hosts are divided into two multicast groups (a CONTROL group and a DATA group) and multicast control messages are transmitted only in the CONTROL group. Hosts not in the CONTROL group will not receive any control messages. Furthermore, each island only needs one ingress host. There are no overheads to select leaders or egress hosts.

BRIEF DESCRIPTION OF THE DRAWINGS

The disclosed inventions will be described with reference to the accompanying drawings, which show important sample embodiments of the invention and which are incorporated in the specification hereof by reference, wherein:

FIG. 4A shows the case where the arrival of the retransmission request is no later than the arrival of the requested packet, i.e., $t_j \geq t_i + d_{ij}$; FIG. 4B shows the case where the arrival of the retransmission request is later than the arrival of the requested packet, i.e., $t_j < t_i + d_{ij}$.

FIG. 5 summarizes these requirements on qualified recovery neighbors.

FIG. 6A shows the result of tuning the multicast ratio θ, FIG. 6B shows the results of tuning the island size S.

Finally, FIGS. 7A, 7B, 7C and 7D compare the performance of different ALM protocols.

DETAILED DESCRIPTION OF THE PREFERRED EMBODIMENTS

Figure 1:
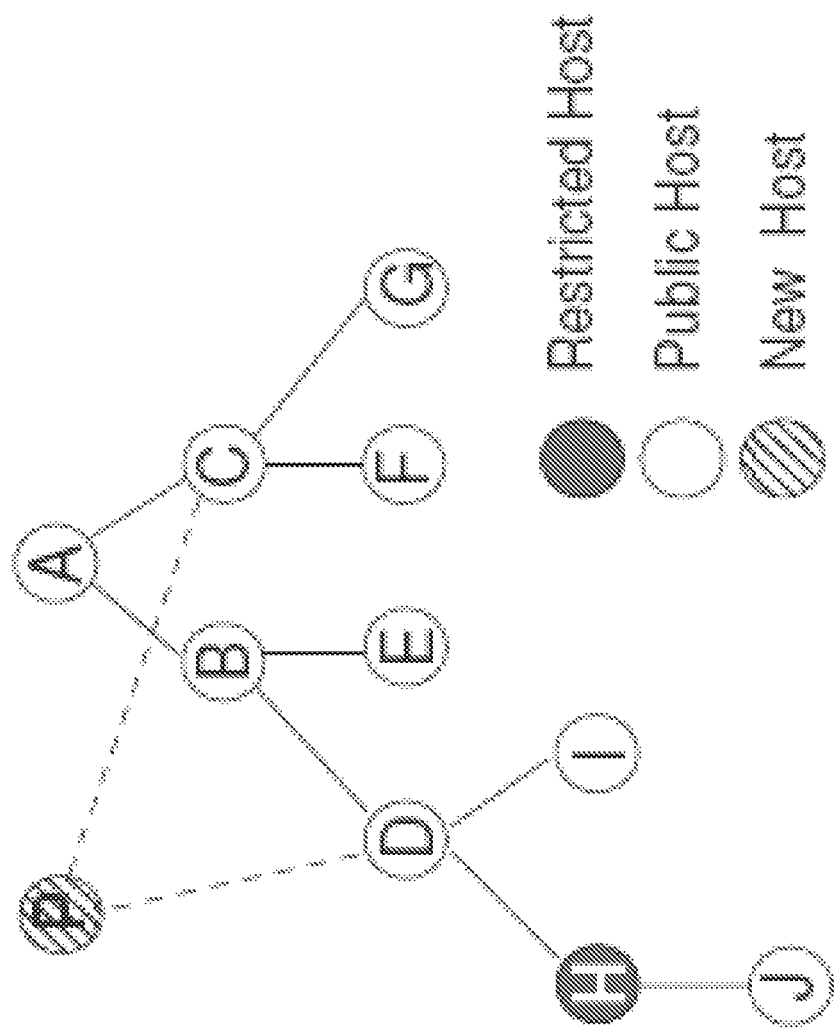
FIG. 1 shows an example of host joining in the overlay tree.

The numerous innovative teachings of the present application will be described with particular reference to presently preferred embodiments (by way of example, and not of limitation).

In SIM, unicast connections use TCP, and IP multicast within an island uses UDP (TCP is not available in IP multicast). In the following discussion, a parent of a host refers to the host's parent in the overlay tree, and the source distance of a host refers to the delay between the source and the host in the overlay tree. A host or a peer node can be a computer, a mobile computing device, a video/TV phone, a wireless phone with media capability or any video device with networking capability.

A. Construction of the Overlay Tree

The preferred embodiment teaches building a tree with low end-to-end delay. The tree construction mechanism is preferred to be distributed and scalable, and the algorithm should be simple with low setup and maintenance overheads. A practical problem in setting up connections is that in the Internet some hosts may be behind Network Address Translations ("NAT") and only have limited connectivity. Such a host is called restricted. A host that is not behind any NAT is called public. A restricted host can only communicate with public, hosts or other restricted hosts behind the same NAT, while a public host can communicate with either a restricted host (with the restricted host being the initiator of the connection) or a public one.

To accommodate restricted hosts in ALM, the preferred embodiment integrates the Basic Contributor solution to achieve NAT traversal. The Basic Contributor approach allows restricted hosts to upload data. This approach makes more efficient use of the available bandwidth.

A new host needs to identify whether it is public or restricted before joining the tree. This can be achieved by the STUN protocol. Furthermore, each host maintains a heap $H_p$ to store its potential parents. In the first iteration, the new host contacts a Rendezvous Point ("RP") to obtain a list of public hosts in the system. It measures the round-trip time ("RTT") to these hosts and inserts them into $H_p$ in an increasing order of the RTT.

In the next iteration, the new host pops k hosts with the smallest RTT from $H_p$ and sends a NeighborQuery message to each of the hosts that have not been sent such a message to before (here k is a system parameter)

If a host receives a NeighborQuery message from a public new host, it replies with the IP addresses of its public neighbors and informs its restricted neighbors to contact the new host. The new host can hence communicate with all the neighbors of the queried host and obtain the RTT to each of them. The new host then inserts the neighbors into $H_p$ according to their RTT.

If a host receives a NeighborQuery message from a restricted new host, it replies with the addresses of all its public and restricted neighbors. The purpose of responding with the restricted neighbors is to detect whether these hosts and the new one are behind the same NAT. If they are, the restricted neighbors are able to communicate with the new host. Furthermore, the queried host asks its restricted neighbors to report their public neighbors to the new host. The new host then communicates with all the returned hosts and obtains the RTT to each of them. Finally, the new host inserts into lithe hosts whose RTT from the new host is available.

After the new host: obtains the RTT to all the returned hosts, it pops k closest ones from $H_p$. The iteration is repeated until the improvement in the smallest RTT is lower than a certain threshold, or the number of iterations exceeds a certain value t. At the end of the process, the new host: selects from its current m closest hosts the one with the highest forwarding bandwidth as its parent, where m is a tunable system parameter. Notice that if the new host is public, its heap $H_p$ may contain some restricted hosts. Since a public host cannot initiate connection to a restricted host, the new host should keep the connection between them after RTT measurement. After the new host successfully joins the overlay tree, it can release these connections.

Note that a restricted host can only select a public host or another restricted host behind the same NAT as its parent. If all public, hosts in the system are occupied, new restricted hosts will not be able to join the overlay tree. Hence requiring public hosts to preferentially select restricted hosts as parents would increase the possibility for a restricted host to find a public host. Thus for a public new host, its measured RTT from a restricted host is multiplied by a constant $\alpha(\alpha<1)$.

FIG. 1 shows an example of host joining in the overlay tree. Suppose k=2 and P is a new host. P first obtains a list of public, hosts from the RP (not shown in the figure). Suppose the list contains C, D, E and F. P then pings all these hosts and inserts them into $H_p$. Suppose that C and D are two closest ones among the hosts.

If P is a public host, it pings C's public neighbors (i.e., A, F and G) and D's public neighbors (i.e., B and I). Furthermore, D has a restricted neighbor H. D will inform H to ping, P. In this way. P can obtain the RTT to all the neighbors of C and D. P then inserts all the neighbors into $H_p$ and completes this iteration. In the next iteration, it pops two closest hosts from $H_p$ and sends NeighborQuery messages to them as described above. Such iteration stops if any of the conditions discussed above is satisfied.

On another hand, if P is a restricted host, when it sends NeighborQuery messages to C and D, C as well as D will reply with their public neighbors (i.e., A, F, G, B and I). Furthermore, D has a restricted neighbor H. D informs H to set up a connection with P, and asks H to report its public neighbors other than D (i.e., J) to P. P then measures the RTT to all the returned hosts, and the hosts with available RTT are inserted into $H_p$ (H may not be able to set: up a connection with P since they may not be behind the same NAT). Afterwards, a new iteration starts.

If a host leaves, its children need to re-join the tree and find new parents. A re-joining host sends a NeighborQuery message to its grandparent using the same procedure as joining.

B. Integrating IP Multicast

In the preferred embodiment, after a host joins the overlay tree, it detects an island to join. Each streaming session has two unique class-D IP addresses for IP multicast. One is used for multicasting control messages, and the other is used for multicasting streaming data. The groups of hosts corresponding to these two IP addresses are called CONTROL group and DATA group, respectively.

In the preferred embodiment, each island has a unique ingress host. This host is responsible for accepting data from outside of the island and multicasting them within the DATA group. Other hosts within the island then accept streaming data from IP multicast instead of overlay unicast. A host within the island is called a border host if its overlay parent is not within the island. The ingress is a border host. In SIM, border hosts (including the ingress) join both the CONTROL group and the DATA group, and non-border hosts only join the DATA group.

Selection of the Ingress

Figure 2:
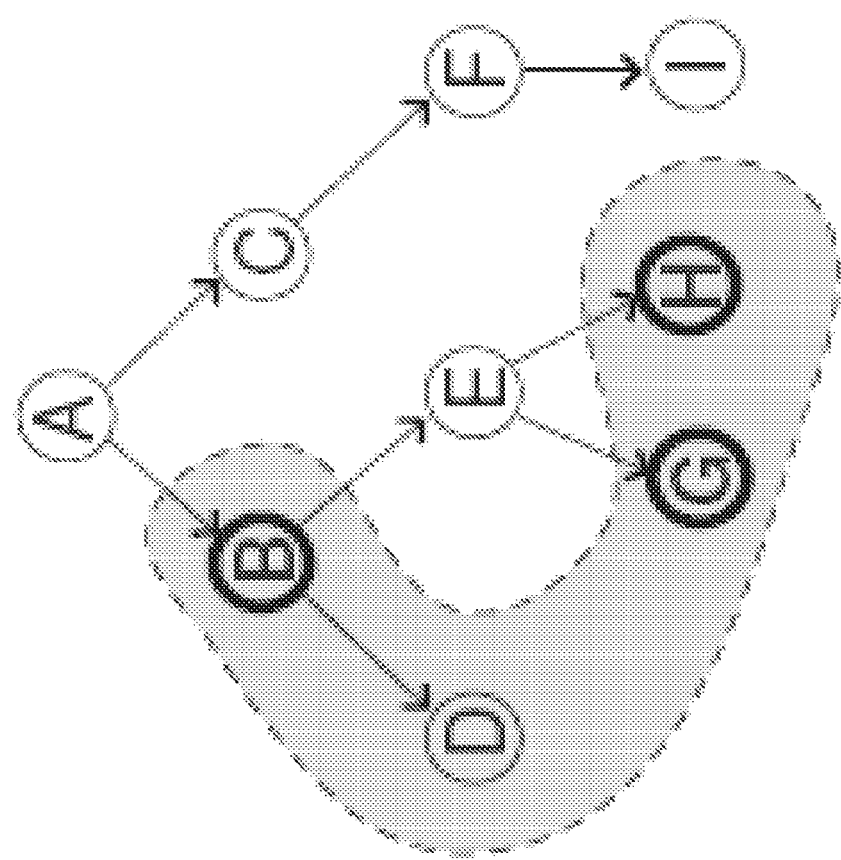
FIG. 2 illustrates an example of ingress selection.

Proper selection of the ingress is important for efficient data distribution. If a ingress has a large source distance, all the hosts within its island will accordingly suffer large source distances. Furthermore, not every border host can become a ingress. FIG. 2 illustrates an example of ingress selection. Hosts first form an overlay tree. Then, B, D, G and H are detected within the same island, and B, G and H are three bonier hosts. However, among the three border hosts, only B can serve as the ingress, if G (or H) becomes the ingress, all the other hosts within the island will stop receiving data from their overlay parents. When B is waiting for the data. IP multicast by G, E cannot receive any data from B. Consequently, G cannot receive any data from E. A deadlock is hence formed.

The preferred embodiment addresses these problems by requiring each host record its source distance. The distance can be computed along the tree in a top-down manner such that the source distance of a host is equal to the sum of its parent's source distance and the delay from its parent to itself. A ingress is hence selected from the border hosts as the one with the minimum source distance.

The ingress host periodically multicasts KeepAlive message containing its source distance in the CONTROL group. It also multicasts streaming data within the DATA group. Initially, the ingress of an island is the island's first joining host. A border host becomes the new ingress if:

The current ingress leaves or fails (detected through the missing of KeepAlive messages), or;

A non-ingress border host has a smaller source distance than the current ingress: when a border host finds that its own source distance is smaller than the smallest source distance being multicasted, it keeps multicasting its own source distance within the CONTROL group; On the other hand, if a border host receives a message reporting a smaller source distance, it stops multicasting its own source distance. Pretty soon, only the border host with the smallest source distance will multicast its source distance. If this border host is not the ingress, it will substitute the current ingress.

Island Detection

In the preferred embodiment, the RP maintains the two class-D IP addresses. When a new host first obtains the addresses and a list of already-joined hosts from the RP. After it joins the overlay tree as described above, it joins the CONTROL group:

If an island exists, the host receives the ingress's KeepAlive messages. The host joins the DATA group. It then detects whether itself is a border host. If it is, it remains in the CONTROL group; Otherwise, it exits the CONTROL group.

To determine whether a host is a border host, the host multicasts a BorderIdentification message within the CONTROL group. If its parent receives the message, the parent unicasts a response message to the host using TCP. If the host does not receive any response after a certain time, it classifies itself as a border host.

A non-ingress host in the DATA group stops receiving streaming data from its overlay parent Instead, it accepts data transmitted by IP multicast. The connection to its parent is only used for transmitting control messages. If this host becomes a ingress later, it resumes the overlay connection and accepts data from its parent again.

If the host does not find any island to join, it forms an island only consisting of itself and becomes the island ingress.

Figure 3A:
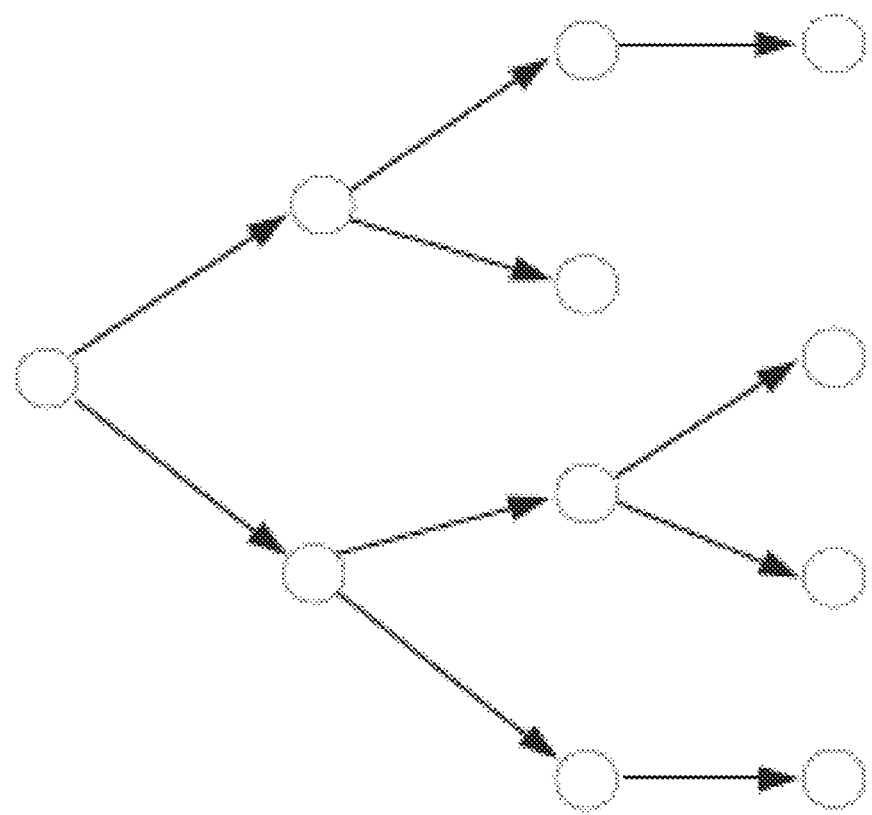
FIG. 3A depicts an example overlay tree for data delivery.
Figure 3B:
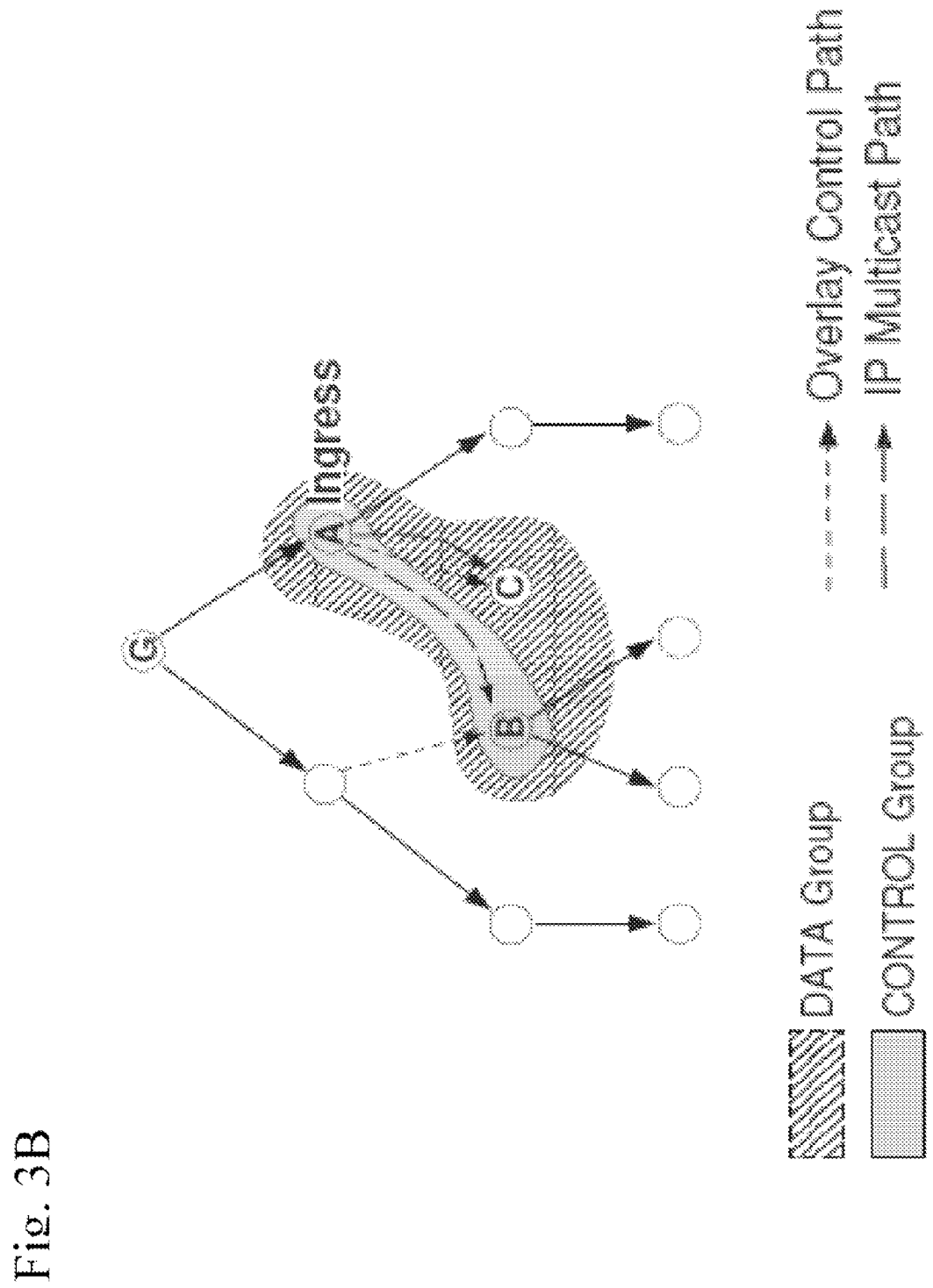
FIG. 3B shows an example on how IP multicasting works based on an overlay tree in FIG. 3A.

FIG. 3 shows an example of data delivery with IP multicast. FIG. 3A shows an example overlay tree. FIG. 3B shows, in the FIG. 3A example tree, hosts A, B and C join the CONTROL group and detect that they are within the same island. A is elected as the island ingress. B is a normal border host and C is a non-border host. Therefore, A and B are in both the CONTROL group and the DATA group while C is only in the DATA group. A then accepts data from its overlay parent G and multicasts them within the DATA group. The incoming overlay paths of B and C are then used to deliver control messages instead of streaming data. If A leaves the system, B will be elected as the new ingress since it is the only border host within the island. B will then resume data delivery along its overlay path and multicast data within the island.

C. Improving System Resilience

The preferred embodiment teaches two ways to improve system resilience, building multiple trees and conducting packet loss recovery.

Building Multiple Trees

Using a single tree may not offer satisfactory service. First, hosts in the system are heterogeneous with different incoming and outgoing bandwidth. A host's incoming path may not be able to provide enough bandwidth for streaming. Second, quality of service degradation at a host (e.g., packet loss or host failure) affects all its descendants.

To achieve high streaming quality, the preferred embodiment uses multiple description coding (MDC) to encode streaming data into multiple descriptions and distribute the descriptions along multiple trees.

MDC encodes data into several descriptions. When all the descriptions are received, the original data can be reconstructed without distortion. If only a subset of the descriptions is received, the quality of the reconstruction degrades gracefully. The more descriptions a host receives, the lower distortion the reconstructed data have. Therefore, the source can encode its media content into M descriptions using MDC (where M is a tunable parameter), and transmit the descriptions along M different trees. Note that a host has different descendants in different trees. The descendant of a host in one tree is usually not the host's descendant in other trees. Therefore, packet loss at a host or failure of the host only causes the loss of a single description (out of M descriptions) at each of its descendants. The system resilience is hence improved.

Packet Loss Recovery

Packets may get lost due to background traffic or path host failure. The preferred embodiment provides an efficient loss recovery mechanism to deal with temporary packet loss.

Design Principle. Traditional source recovery and parent recovery schemes have loss correlation problem and implosion problem. The losses of all, downstream hosts are correlated upon an upstream loss. The parent of a failed host is hence likely in error, leading to low retransmission efficiency. Furthermore, such recovery leads to implosion if retransmission requests from downstream hosts are not aggregated (which is often the case for simplicity). Lateral Error Recovery ("LER") tries to solve these problems. LER randomly divides hosts into multiple planes and independently builds an overlay tree in each plane. A host needs to identify some hosts from other planes as its recovery neighbors. Whenever a loss occurs, the host performs retransmission from its recovery neighbors. LER limits the trees in different planes of similar sizes. Otherwise, a host in a small tree needs to serve as the recovery neighbor of multiple hosts in a large tree and has high workload. However, the balancing of multiple trees in a dynamic system requires high control overhead and is not easy.

The preferred embodiment simplifies the selection of recovery neighbors by using only a single plane instead of multiple planes. Here, the recovery neighbor of a host cannot be: 1) in the host's subtree; 2) an ancestor of the host; or 3) in the same island as the host. Thus, the loss correlation between a host and its recovery neighbor in this scheme is higher than that in LER wherein the path from the root to a host and the path from the root to the host's recovery neighbor are disjoint on the overlay. But this is not true in this scheme. However, this scheme does not need to balance multiple trees, thereby introducing much lower control overhead.

Recovery neighbors are useful, for improving streaming quality. For example, if the path between a host and its parent does not have enough bandwidth, the host can require missing data from one or multiple of its recovery neighbors. This enables multiple-path delivery as in gossip streaming.

Selection of Recovery Neighbors. In addition to the three basic requirements for selecting recovery neighbors listed as above, more should be considered to achieve quick loss recovery. First, a streaming application usually has a certain recovery deadline $\delta$ after detecting a loss. Define recovery latency as the time interval from the moment a loss is detected to when the repair is received. The recovery latency should be smaller than $\delta$. A host hence cannot select a faraway host as its recovery neighbor, for the retransmission time may exceed the recovery deadline. Second, the lost packet at a host is not available at an arbitrary host in the system. If the buffers of hosts have finite sizes, it may happen that the packet needed is no longer in the buffers. Even if the buffers are infinitely large and hosts cache all the data they have received, it may happen that hosts have different end-to-end delays and the requested data have not arrived at all the hosts in the system. Finally, compared to LER where that the buffers of hosts are all assumed infinitely large, the current approach assumes all hosts have limited buffer sizes.

Figure 4A:
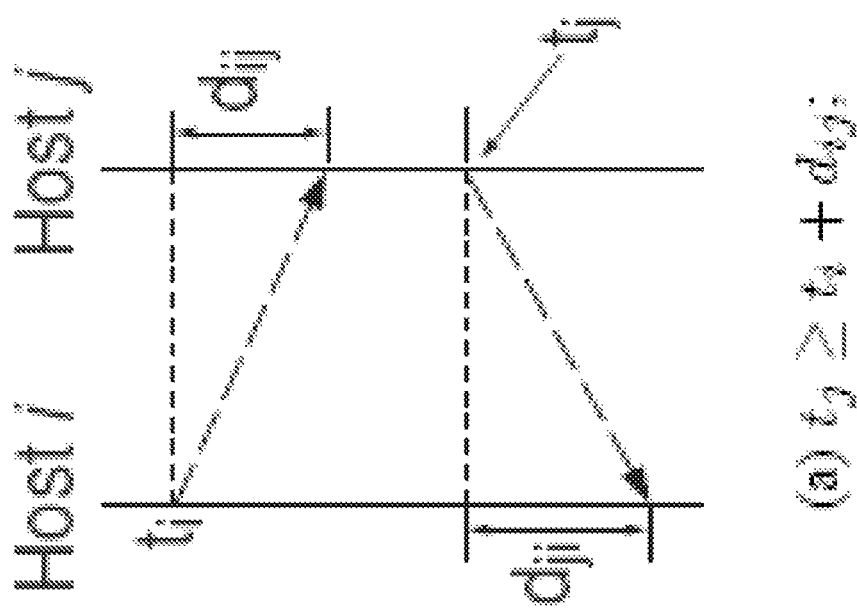
FIG. 4A and FIG. 4B show a time diagram describing packet loss and recovery.
Figure 4B:
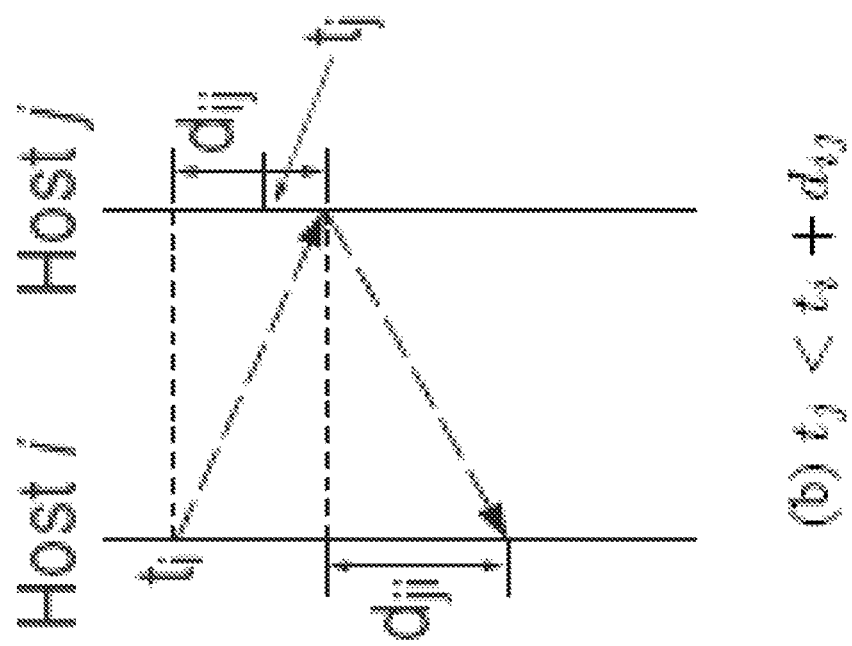

Let $t_i$ and $t_j$ be the source distances of host i and j, respectively, where j is a recovery neighbor of i. Let $d_{ij}$ and $d_{ji}$ be the one-way delay from i to j and from j to i, respectively. Let $B_i$ and $B_j$ be the buffer sizes of i and j (in terms of time), respectively. As usual, we assume $B_x \geq \delta$, for any host x in the system. FIGS. 4A and 4B show the time diagram upon a loss detected at time $t_i$ at host i, given that the packet is transmitted from the source at time 0. When i requests a retransmission from host j at time $t_i$, the retransmission request arrives at j at time $t_i+d_{ij}$.

FIG. 4A shows the case where the arrival of the retransmission request is no later than the arrival of the requested packet, i.e., $t_j \geq t_i+d_{ij}$. The recovery latency is hence $t_j+d_{ji}-t_i$. Clearly, the buffer size does not matter in this case, and the only requirement is $t_j+d_{ji}-t_i \leq \delta$. FIG. 4B shows the case where the arrival of the retransmission request is later than the arrival of the requested packet, i.e., $t_j<t_i+d_{ij}$. The recovery latency is hence $d_{ij}+d_{ji}$. Clearly, it is required that $d_{ij}+d_{ji} \leq \delta$. Furthermore, upon the arrival of the retransmission request, the requested packet should still be in host j's buffer, i.e., $t_i+d_{ij} \leq t_j+B_j$. FIG. 5 summarizes these requirements on qualified recovery neighbors. Among all the qualified candidates, it is better to select the ones with high-bandwidth connections. If no qualified recovery neighbor can be found, then select the ones with low recovery latency from the Type-I hosts.

The detailed selection process is summarized as follows. For simplicity, assume that $d_{ij}$ and $d_{ji}$ are equal to half of the WIT from i to j and from j to i, respectively. A host i first joins the overlay tree for data delivery. It then contacts its ancestors within $L_1$ hops. In each contact, host i checks the ancestor's descendants within $L_2$ hops. Here $L_1$ and $L_2$ are two adjustable system parameters. If the host checked satisfies the above requirements (including the three basic principles), host i acids the host as a candidate of its recovery neighbor. If the requirements cannot be satisfied but the host is of Type-I, host i adds the host to a list of Type-I hosts. After collecting a certain number of recovery neighbors and Type-I hosts, host i stops the selection process. Otherwise, host increases $L_1$ and $L_2$ and keeps selecting recovery neighbors.

D. Evaluation

Illustrative simulations of the preferred embodiment are performed on Internet-like topologies. 10 Transit-Stub topologies are generated with GTITM. Each generated topology is a two-layer hierarchy of transit domains and stub domains. The transit domains form a backbone and all the stub domains are connected to the backbone. In the simulations, each topology has 4 transit domains and 280 stub domains. On average, a transit domain contains 10 routers and a stub domain contains 8 routers. Each topology consists of 2280 routers and about 11000 links. A group of 1024 hosts are randomly put into the network. A host is connected to a unique stub router with 1 ms delay, while the delays of core links are given by the topology generator. Link bandwidth is set as follows: A backbone link (at least one end point is a transit router) can support 8 concurrent media streams, and a non-backbone link can support 3-6 concurrent media streams. The distribution of islands is set as follows: randomly select some hosts from the stub domains that consist of at least one host and set them to be multicast-capable. Define multicast ratio $\theta$ as the ratio of the number of multicast-capable stub domains to the number of stub domains that consist of at least one host, and define island size S as the number of stub domains in an island. Note that in the real Internet, routers in a multicast island are often close to each other. Therefore, in the simulations, only the stub domains connected to the same transit router can be within the same multicast island.

The SIM parameters are set as follows. Each new host obtains a number of (at most 10) randomly selected hosts from the RP when joining. A new host repeats the ping iterations for at most 6 times and in each iteration pings at most 10 hosts (i.e., t=6 and k=10). Two tree-based ALM protocols, Narada and Overcast, are implemented for comparison.

Narada is one of the pioneering ALM protocols and aims at building a low-delay overlay tree. Its performance can serve as the benchmark. In Narada, each host has a degree bound according to its edge bandwidth. Overcast aims at constructing a tree with high bandwidth, which achieves low stresses on links.

The following metrics are used to evaluate the protocols:
Relay delay penalty (RDP): defined as the ratio of the overlay delay from the source to a given host to the delay between them along the shortest unicast path.
Link stress: defined as the number of copies of a packet transmitted over a certain physical link.
Resource usage: defined as $\Sigma_{i=1}^{L} d_i \times s_i$, where L is the number of links active in data transmission, $d_i$ is the delay of link i and $s_i$ is the stress of link i. Resource usage is a metric of the network resource consumed in data deli Very.

Figure 6A:
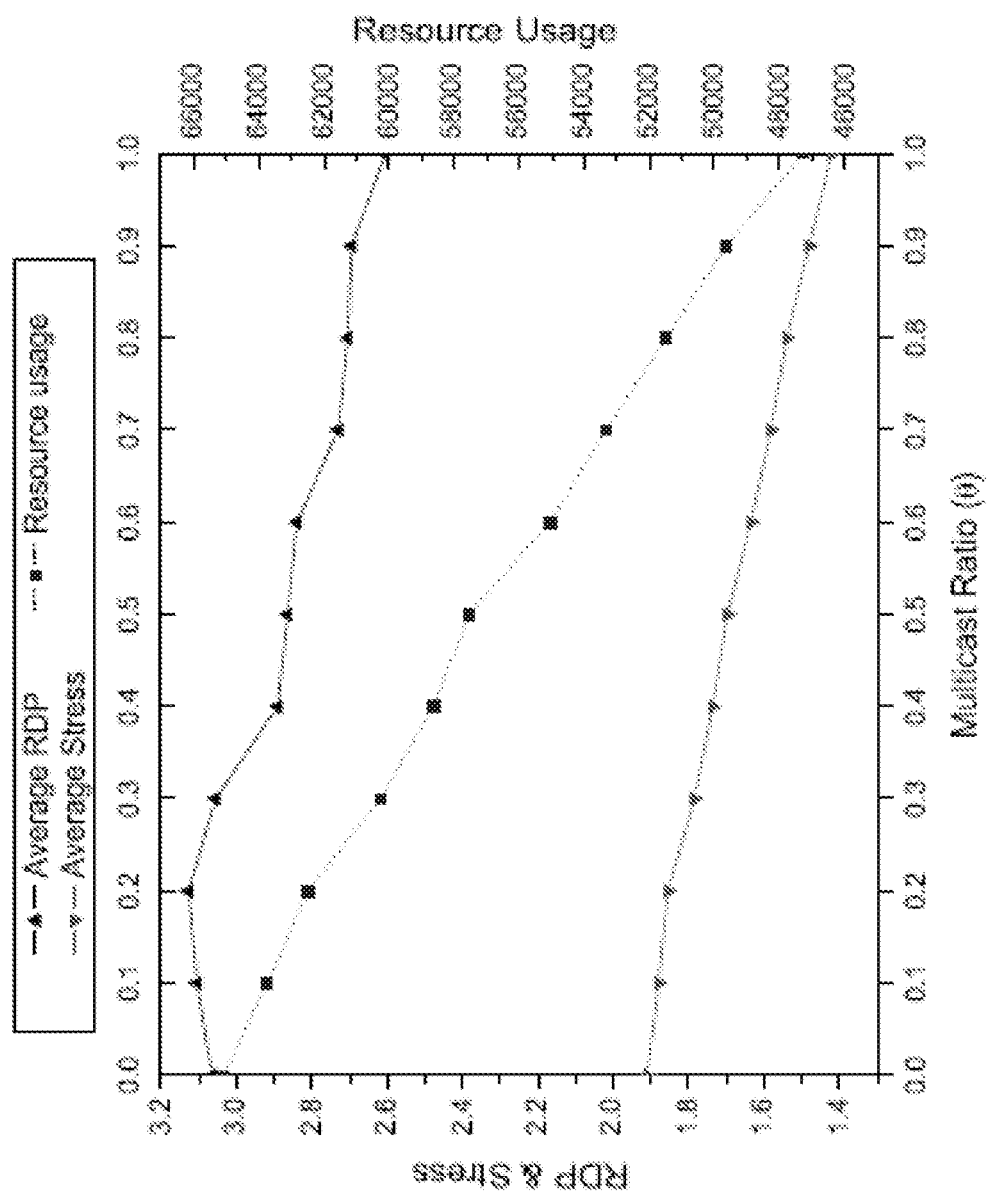
FIG. 6A and FIG. 6B show the performance of a SIM tree with different parameter settings.
Figure 6B:
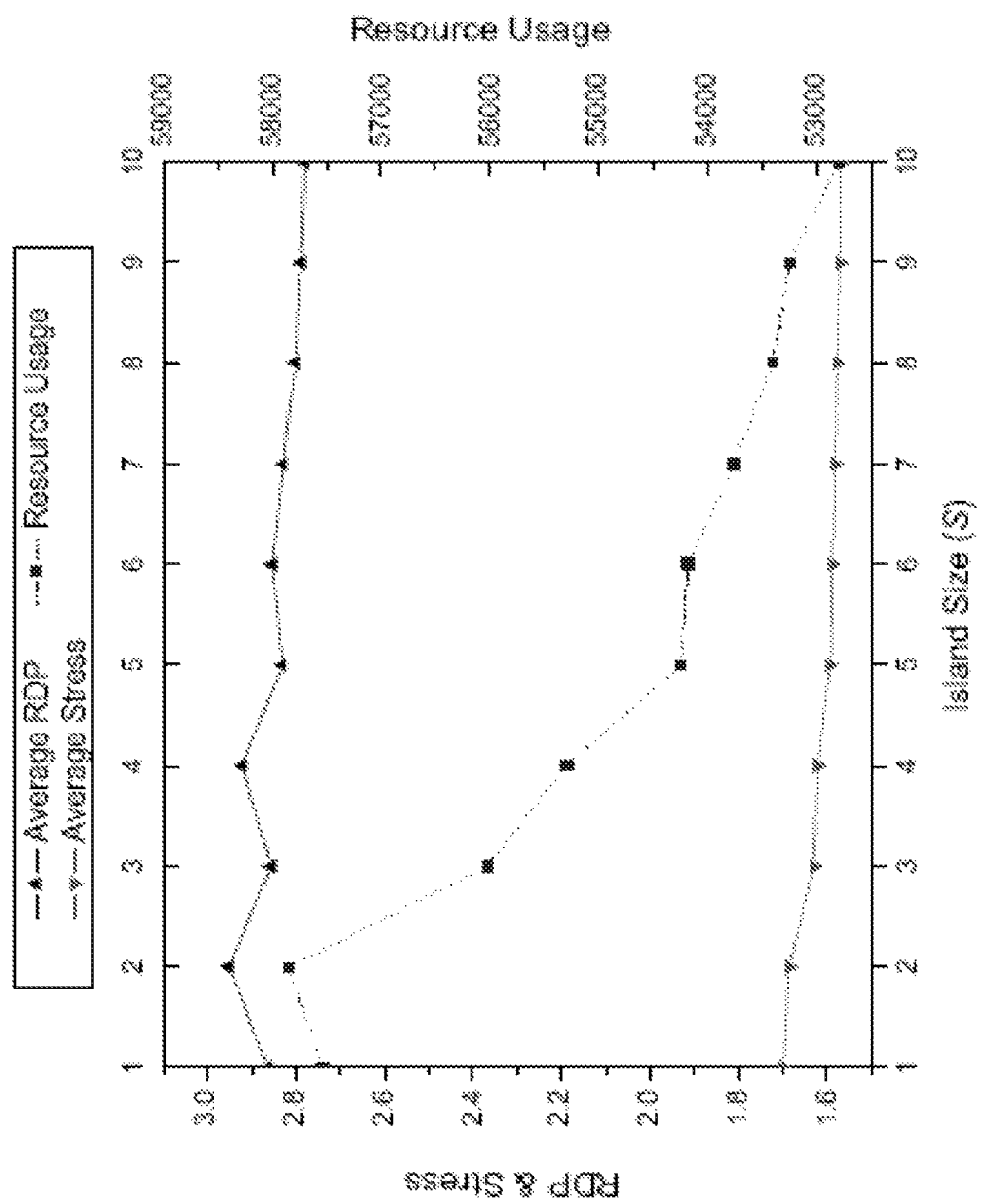

FIGS. 6A and 6B show the performance of a SIM tree with different parameter settings. FIG. 6A shows the result of tuning the multicast ratio $\theta$. As $\theta$ increases, the average RDP first increases and then decreases. This is because two hosts within the same multicast island are not necessarily close to each other, therefore selecting a host from other domains as the parent may introduce lower delay than simply receiving IP multicast packets from the ingress. However, when most hosts in the system are within multicast islands, the distance between a host and its ingress is often not large. The average RDP is hence low. On the other hand, both the average stress and the resource usage decrease as θ increases. When θ increases from 0 to 1.0, the average stress and the resource usage are reduced by 25.7% and 27.4%, respectively. Therefore, the utilization of IP multicast in ALM can efficiently reduce the loads on links and the overall bandwidth consumption FIG. 6B shows the results of tuning the island size S. As S increases, the average RDP fluctuates around 2.85. Averagely, a maximum island in our simulations can contain 10 stub domains (i.e., S=10). In fact, from simulation results, the average number of hosts in an island when S=10 is around 30. Therefore, the islands formed are small as compared to the group size and such small islands cannot significantly reduce the end-to-end delay. RDP is expected to be lower when the islands are larger. Different from the average RDP, the average stress decreases as S increases. Clearly, IP multicast always achieves an average stress of 1.0. The more IP-multicast paths in the delivery tree, the lower average stress. On the other hand, the resource usage first slightly increases and then decreases when S increases. It shows that: the penalty in delay exceeds the improvement in stress when S increases from 1 to 2. When S continues increasing, the improvement in stress leads to the reduction in the resource usage.

Figure 7A:
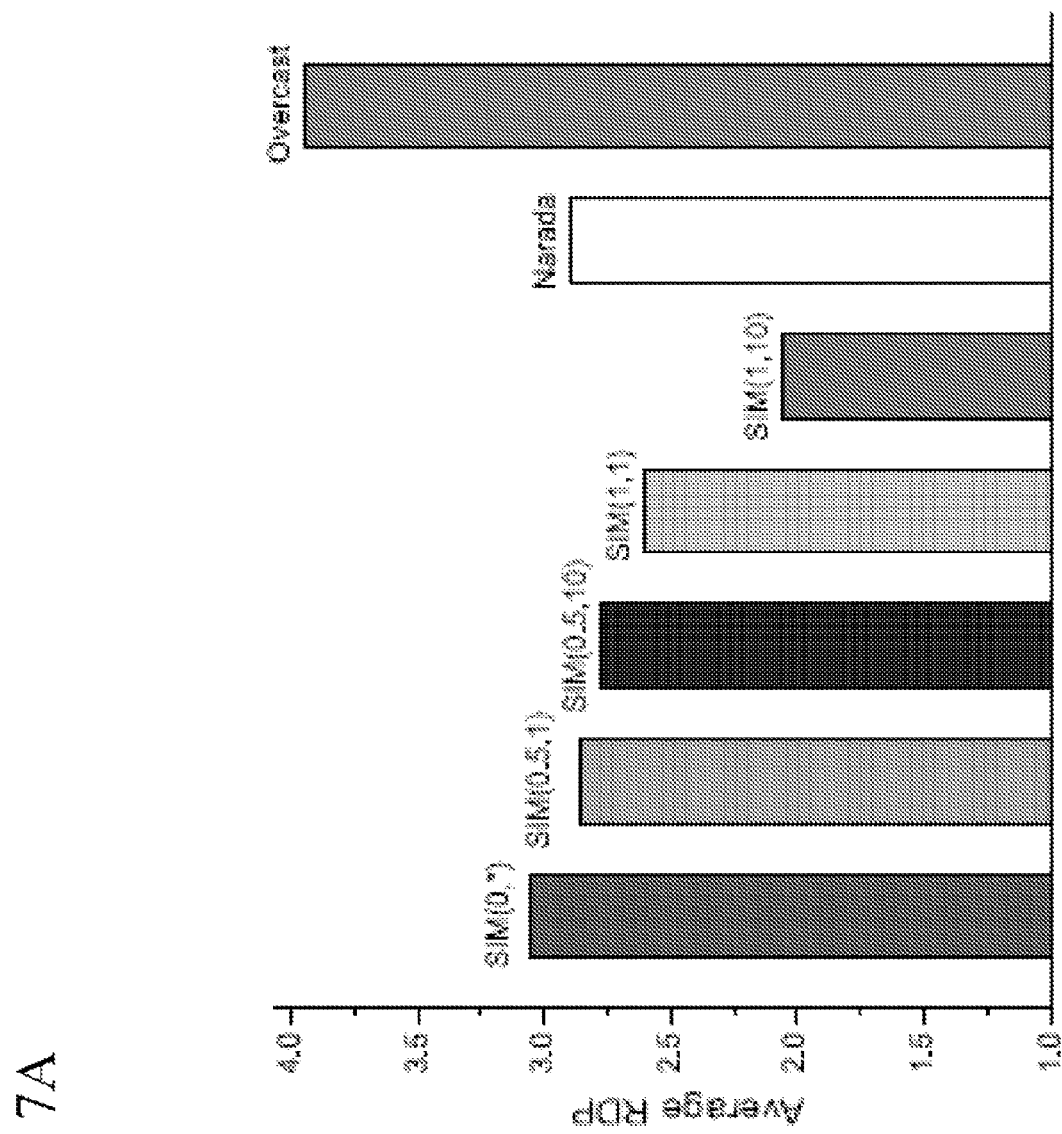
FIG. 7A shows the average RDP achieved by different protocols.

FIGS. 7A, 7B, 7C and 7D compares the performance of different ALM protocols. A set of (θ, S) combinations is selected for SIM. FIG. 7A shows the average RDP achieved by different protocols. Overcast has the highest RDP among the protocols. This is because it only aims at improving tree bandwidth and does not optimize the tree in terms of end-to-end delay. Furthermore, to reserve bandwidth for future hosts, each host in Overcast is inserted into the tree as far from the source as the bandwidth constraint allows. It hence performs poorly in terms of RDP. SIM(0, *) shows the result with no multicast islands. It performs slightly worse than Narada. When θ is 0.5, the average RDP of SIM is lower than that of Narada. Furthermore, when θ=1 and S=10, all the hosts are within islands and the average RDP of SIM is significantly reduced.

Figure 7B:
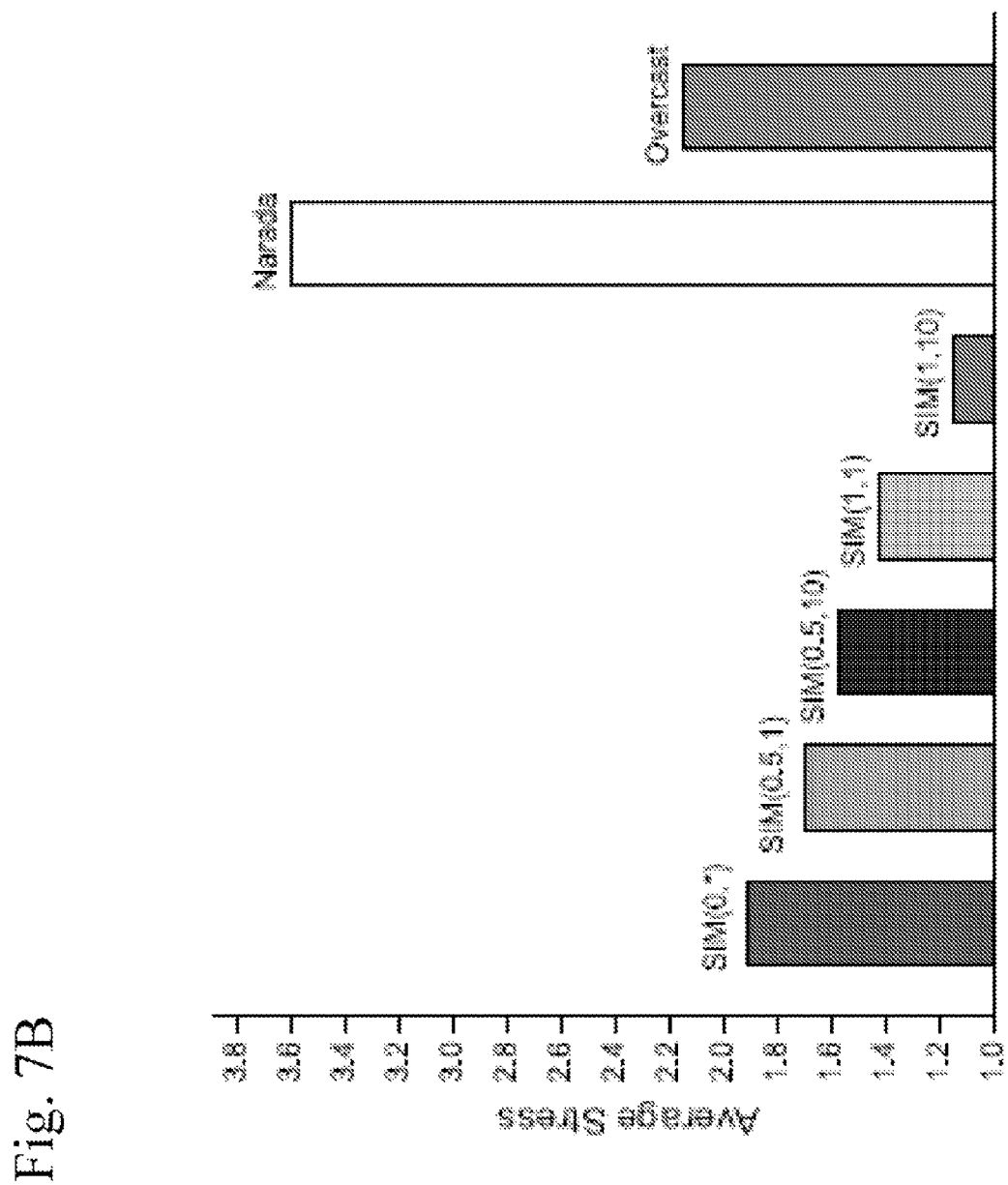
FIG. 7B compares the average stress achieved by different protocols.
Figure 7C:
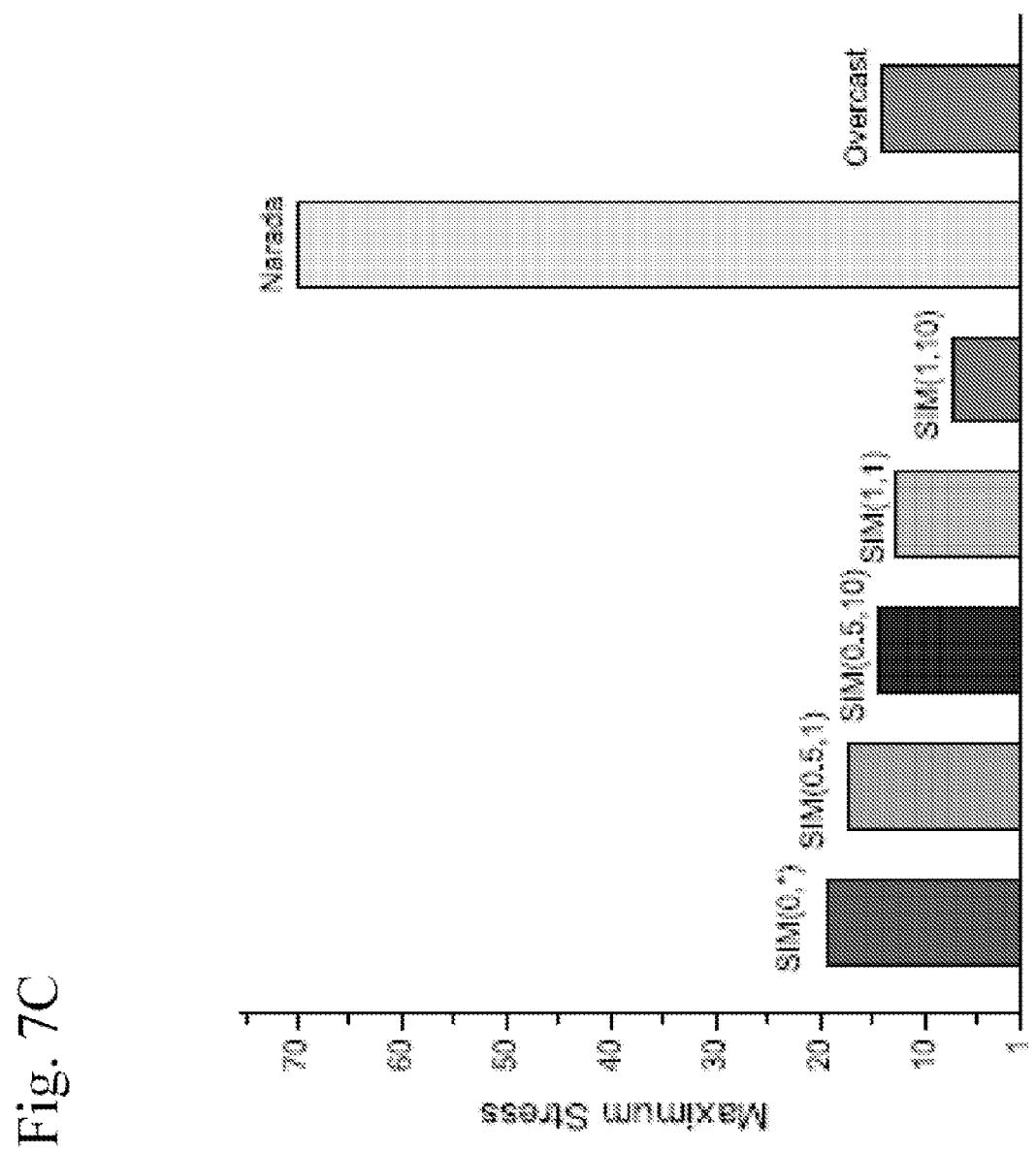
FIG. 7C shows the average stresses achieved by the protocols.

FIG. 7B compares the average stress achieved by different protocols. Narada has the highest average stress. Overcast targets maximizing bandwidth and accordingly minimizes link stress. It hence has lower average stress. SIM shows very low average stress, even in the absence of multicast islands. With the increase of θ and S, the average stress of SIM decreases. When θ=1 and S=10, the average stress is only 1.14, which is very close to the optimal value of 1.0. The maximum stresses achieved by the protocols have similar trends as the average stresses as shown in FIG. 7C. The utilization of IP multicast can efficiently reduce the maximum stress of SIM, from 19.4 (when θ=0) to 7.5 (when θ=1 and S=10). Clearly, lower stresses indicate lighter loads on links and hence higher transmission rates. From the simulation. SIM can achieve low stresses and is efficient for streaming applications.

Figure 7D:
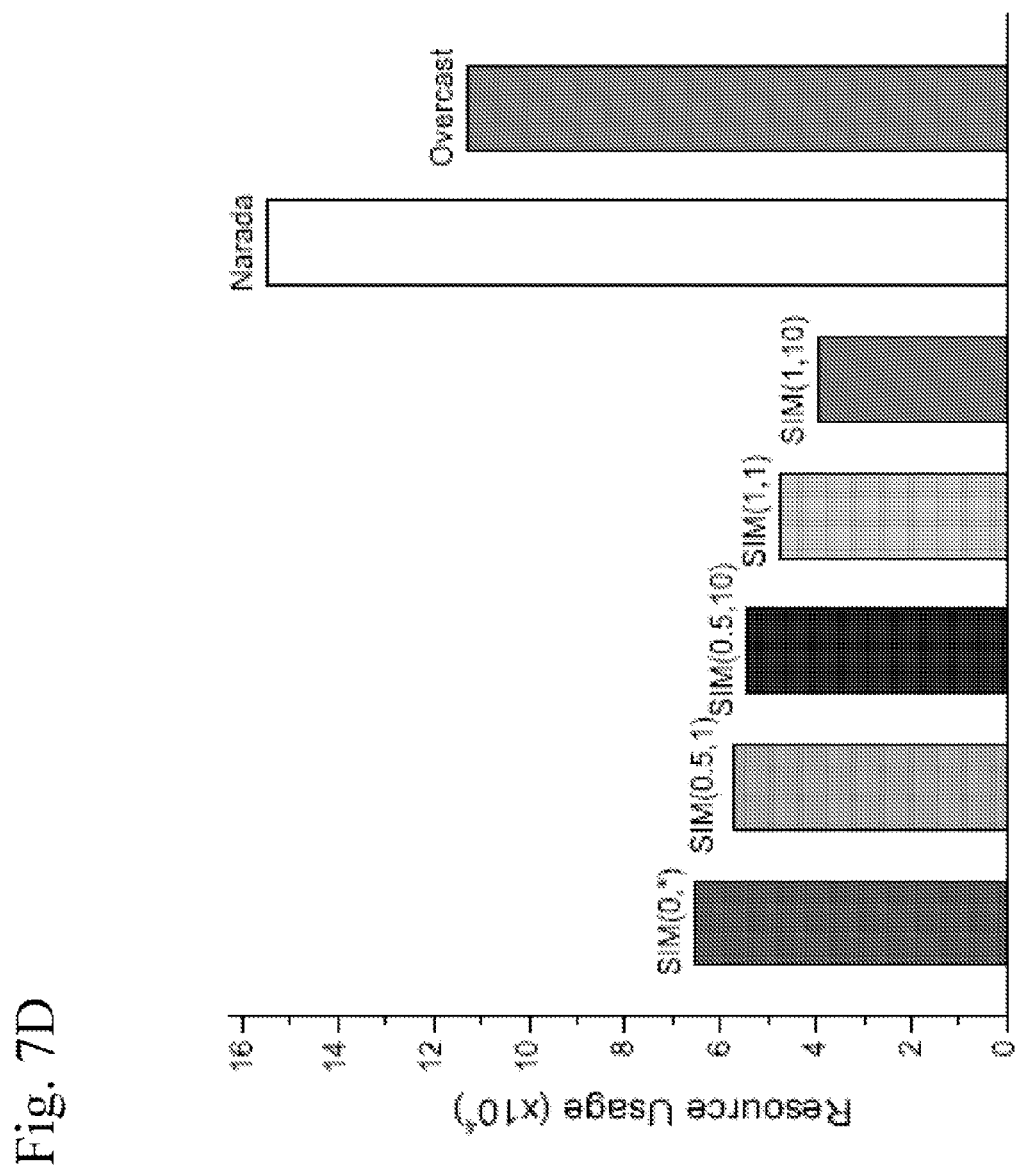
FIG. 7D shows the resource usage achieved by different protocols.

FIG. 7D shows the resource usage achieved by different protocols. Since Narada has the highest stress and Overcast has the highest RDP, their resource usage is high. SIM achieves good tradeoff between RDP and link stress. Its resource usage is significantly lower than Narada and Overcast.

According to various disclosed embodiments, there is provided: A media multicasting architecture, comprising: an overlay peer-to-peer network including a plural of nodes forming a tree topology; and at least one island comprising a subset of said tree nodes wherein all nodes in said island are IP-multicast-capable and one of said island nodes is designated ingress node for said island to receive media streams from a node in said tree but outside said island via unicast and to retransmit said streams within the island using IP multicasting; wherein the islands are adaptively formed or restructured when (a) a new IP-multicast-capable node joins said overlay tree or (b) one of said nodes leaves said overlay tree.

According to various disclosed embodiments, there is provided: A method for media multicasting in peer-to-peer network, comprising the steps of: constructing at least one overlay tree by joining a new node to an existing node in said tree with sufficiently low transmission delay; and forming adaptively IP-multicasting islands in said overlay tree wherein one node in ones of said islands is designated ingress node whereby media streams into said ingress node from node external to said island via unicast and out of said ingress node via IP multicasting to all island internal nodes associated with said ingress node.

According to various disclosed embodiments, there is provided: A media multicasting system, comprising: at least one overlay peer-to-peer tree including a plural of public nodes and restricted nodes; a repository for maintaining data including address information of said, public nodes; at least one island as subset of said tree nodes comprising only IP-multicast-capable nodes with one of them designated ingress node to receive media streams from a node external to said island via unicast and to retransmit said streams to nodes within said island using IP multicasting; and a control plane through which said islands are identified and said ingress nodes are elected.

According to various disclosed embodiments, there is provided: A method for media multicasting, comprising steps of: maintaining at least one overlay peer-to-peer tree including a plural of public nodes and restricted nodes, further comprising steps of obtaining an optimal node in said tree for a node; and connecting said node to said optimal node as its parent node to join said tree; maintaining at least one island comprising subset of IP-multicast-capable nodes in said tree, comprising steps of: joining said island after determining a node is border node within a control group; and electing ingress node from all nodes in said island with optimal source distance; streaming media into said ingress node via unicast and then into said island nodes using IP multicasting; and optionally, using a single plane to identify recovery neighbors with recovery latency smaller than a pre-defined value as a way to enable multi-path delivery or recover missing data.

MODIFICATIONS AND VARIATIONS

As will be recognized by those skilled in the art, the innovative concepts described in the present application can be modified and varied over a tremendous range of applications, and accordingly the scope of patented subject matter is not limited by any of the specific exemplary teachings given. It is intended to embrace all such alternatives, modifications and variations that fall within the spirit and broad scope of the appended claims.

Some examples of modifications and variations are briefly mentioned above, but many others are possible.

For example, the preferred embodiment focuses on a single tree. Other class of embodiments may use multi-trees along with multiple description coding to (a) handle heterogeneous nodes with different incoming and outgoing bandwidth and (b) provide graceful degradation of the quality of the reconstruction.

For another example, instead of using delay measurement as criteria in constructing overlay tree, other class of embodiments may use distance, bandwidth, throughput or some other network performance parameters. One with ordinary skills in the art shall be able to use a combination of those parameters with different weight assignments to balance different design requirements.

In yet other examples, instead of using certain number of iterations as condition for stopping the search for parent node to join the tree, other class of embodiments may use a timer such that when the timer expires the new node * will select the node with the smallest returned RTT value to connect.

This application reported examples of different system parameter values. They are all adjustable and different sets of values are possible.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

The claims as filed are intended to be as comprehensive as possible, and NO subject matter is intentionally relinquished, dedicated, or abandoned.

All or a portion of features or embodiments detailed herein, whether in connection with a system or a method, can be implemented in a computer-based network, and can be accomplished by employing at least one processor.

What is claimed is:

1. A media multicasting system, comprising:
  an overlay tree representing a peer-to-peer network including a plurality of nodes forming a tree topology;
  at least one island a representing at least one subset of said plurality of nodes, wherein island nodes represented in said at least one island are IP-multicast-capable, none of said island nodes are required to be a leader that manages said island or constructs the overlay tree, and one of said island nodes is designated as an ingress node for said at least one island to receive media streams from a node in said overlay tree but outside said at least one island via unicast and to retransmit said streams within the at least one island using IP multicasting; and
  a construction component stored in a tangible computer-readable medium that is configured to adaptively create or restructure the at least one island when (a) a new IP-multicast-capable node joins said overlay tree or (b) one of said plurality of nodes leaves said overlay tree.

2. The media multicasting system of claim 1, wherein the construction component is further configured to ensure a transmission delay between a given node and an associated parent node in said overlay tree is no longer than a pre-defined measurement.

3. The media multicasting system of claim 1, wherein the construction component is further configured to ensure a transmission delay as measured by RTT (round-trip time) between a given node and an associated parent node in said overlay tree is no larger than a pre-defined value.

4. The media multicasting system of claim 1, wherein said plurality of nodes are devices with at least video playing and networking capabilities.

5. The media multicasting system of claim 1, wherein the construction component is further configured to preferably weight a restricted node relative to a public node when a parent node is selected for a new node that joins said overlay tree.

6. The media multicasting system of claim 1, wherein said unicast is based on TCP (transmission control protocol).

7. The media multicasting system of claim 1, wherein said IP multicasting is based on UDP (user datagram protocol).

8. The media multicasting system of claim 1, wherein said IP multicasting uses Class D IP addresses.

9. The media multicasting system of claim 1, wherein said ingress node is a node, among said island nodes in which said ingress node is a member, with a shortest source distance.

10. A method for media multicasting in a peer-to-peer network, comprising:
  employing at least one processor for constructing at least one overlay tree by joining a new node to an existing node in said at least one overlay tree with sufficiently low transmission delay; and
  forming, adaptively, IP-multicasting islands in said overlay tree wherein said island are not required to comprise a leader node that manages an associated island and one node in an island of said islands is designated an ingress node whereby media streams into said ingress node from a parent node external to said island are delivered via unicast and the media streams are delivered out of said ingress node via IP multicasting to internal nodes of said island associated with said ingress node.

11. The method of claim 10, further comprising configuring the new node for probing at least one but not more than a pre-defined number of nodes in said at least one overlay tree for determining transmission delays between the new node and probed nodes.

12. The method of claim 10, further comprising configuring the new node for probing at least one node in said at least one overlay tree within a pre-defined time for collecting transmission delay measurements.

13. The method of claim 12, further comprising collecting the transmission delay measurements based upon Round Trip Time (RTT).

14. The method of claim 10, further comprising preferentially weighting a restricted node when selecting a parent for a public node when constructing or updating said overlay tree.

15. The method of claim 10, further comprising employing transport control protocol (TCP) for said unicast delivery of the media streams by the parent node.

16. The method of claim 10, further comprising employing user datagram protocol (UDP) for IP multicasting delivery of the media streams by the ingress node.

17. The method of claim 16, further comprising employing Class D IP addresses in connection with the IP multicasting.

18. The method of claim 10, further comprising selecting said ingress node from among associated island nodes whose respective parent node is not a node in a same island as the ingress node.

19. The method of claim 10, further comprising periodically exchanging source distance information among associated island nodes whose respective parent node is not a node in said islands.

20. The method of claim 10, further comprising periodically selecting a new ingress node based upon a shortest source distance among nodes within an overlay tree in which a previous ingress node is a member.

21. The media multicasting system of claim 1, wherein the ingress node is configured to both consume and to forward the media streams in a peer-to-peer fashion.

22. The media multicasting system of claim 1, wherein each of the plurality of nodes included in the peer-to-peer network is configured to contemporaneously enable consumption of the media streams and retransmission of the media streams.

23. The media multicasting system of claim 1, wherein none of the plurality of nodes included in the peer-to-peer network is essential for network integrity.

24. The method of claim 10, further comprising configuring the ingress node for both consuming and forwarding the media streams in a peer-to-peer fashion.

25. The method of claim 10, further comprising configuring all nodes included in the at least one overlay tree for contemporaneously consuming the media streams and retransmitting of the media streams.

26. The method of claim 10, further comprising configuring the peer-to-peer network such that no node or peer included in the peer-to-peer network is essential for network integrity.

27. A system, comprising:
    a memory to store instructions; and
    a processor, coupled to the memory, that facilitates execution of the instructions to perform operations, comprising:
        determining an overlay for a peer-to-peer network in a distributed manner, wherein the overlay has a tree topology for network nodes included in the peer-to-peer network;
        forming a scalable island in response to the determining the overlay, wherein the scalable island comprises island nodes, selected from among the network nodes, that support IP multicast; and
        determining an ingress node for the scalable island from among the island nodes, wherein the ingress node receives inter-island data by way of unicast and retransmits the inter-island data to other island nodes by way of IP multicast.

28. The system of claim 27, wherein the network nodes do not include a unique control node that manages overlay creation, island formation, or ingress node selection.

29. The system of claim 27, wherein the island nodes do not include a unique leader node that manages overlay creation, island formation, or ingress node selection.

30. The system of claim 27, wherein the island nodes do not include a unique egress node that manages sending inter-island data.

31. The system of claim 27, wherein the operations further comprise adaptively creating or restructuring the scalable island in response to a join operation that adds a new node to the scalable island.

32. The system of claim 27, wherein the operations further comprise adaptively restructuring the scalable island in response to a leave operation that removes an existing node from the scalable island.

33. The system of claim 27, wherein the determining the ingress node comprises selecting an island node with a lowest source distance that is characterized as a lowest delay between a parent in the overlay and child in the scalable island.

34. A computer readable storage device storing computer-executable instructions that, in response to execution, cause a device including a processor to perform operations, comprising:
    determining an overlay tree for a peer-to-peer network in a distributed manner, wherein the overlay tree has a tree topology for network nodes included in the peer-to-peer network;
    creating an island in response to the determining the overlay tree, wherein the island comprises island nodes, selected from among the network nodes, that support IP multicast; and
    determining an ingress node for the island from among the island nodes, wherein the ingress node receives inter-island data by way of unicast and retransmits the inter-island data to other island nodes by way of IP multicast.

35. The computer readable storage device of claim 34, further comprising adaptively creating or restructuring the island in response to a join operation that adds a new node to the island.

36. The computer readable storage device of claim 34, further comprising adaptively restructuring the island in response to a leave operation that removes an existing node from the island.

37. The computer readable storage device of claim 34, wherein the determining the ingress node comprises selecting an island node with a lowest source distance that is characterized as a lowest delay between a parent in the overlay and child in the scalable island.

\* \* \* \* \*